United States Patent
Momoeda

(10) Patent No.: US 12,172,288 B2
(45) Date of Patent: Dec. 24, 2024

(54) ELECTRIC TOOL

(71) Applicant: Panasonic Holdings Corporation, Osaka (JP)

(72) Inventor: Kotaro Momoeda, Mie (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 111 days.

(21) Appl. No.: 18/185,774

(22) Filed: Mar. 17, 2023

(65) Prior Publication Data

US 2023/0311293 A1  Oct. 5, 2023

(30) Foreign Application Priority Data

Mar. 30, 2022  (JP) .................... 2022-057422

(51) Int. Cl.
*B25F 5/00* (2006.01)
*H02P 29/00* (2016.01)

(52) U.S. Cl.
CPC .......... *B25F 5/001* (2013.01); *H02P 29/0027* (2013.01)

(58) Field of Classification Search
CPC .............................. B25F 5/001; H02P 29/0027
See application file for complete search history.

(56) References Cited

U.S. PATENT DOCUMENTS

| 2009/0224703 A1 | 9/2009 | Woods et al. |
| 2011/0000688 A1 | 1/2011 | Iwata |
| 2013/0264087 A1 | 10/2013 | Harada et al. |

FOREIGN PATENT DOCUMENTS

JP  2009-202317 A  9/2009

OTHER PUBLICATIONS

Extended European Search Report dated Jul. 27, 2023 issued in the corresponding European Patent Application No. 23165490.6.

*Primary Examiner* — Michelle Lopez
(74) *Attorney, Agent, or Firm* — Rimon P.C.

(57) ABSTRACT

An electric tool includes a motor, a holder, a transmission mechanism, a torque detector, an electronic clutch, and an inhibiting mechanism. The holder is configured to hold a tip tool thereon. The transmission mechanism transmits motive power of the motor to the holder. The torque detector detects a torque value about output torque provided by the tip tool. The electronic clutch is activated when a predetermined condition about the torque value detected by the torque detector is satisfied and thereby controls the motor to make the motor stop running. The inhibiting mechanism is interposed between the motor and the holder. The inhibiting mechanism inhibits transmission of inertial force from the motor to the holder in response to activation of the electronic clutch.

8 Claims, 11 Drawing Sheets

ELECTRIC TOOL

CROSS-REFERENCE TO RELATED APPLICATIONS

The present application is based upon, and claims the benefit of priority to, Japanese Patent Application No. 2022-057422, filed on Mar. 30, 2022, the entire contents of which are hereby incorporated by reference.

TECHNICAL FIELD

The present disclosure generally relates to an electric tool and more particularly relates to an electric tool including a motor.

BACKGROUND ART

JP 2009-202317 A discloses an electric rotary tool.

The electric rotary tool includes a motor unit and a control circuit section for controlling the motor unit. The control circuit section calculates fastening torque based on either a drive current for the motor unit as detected by a current detection means or the number of revolutions of the motor unit as detected by a number of revolutions detection means. When the fastening torque thus calculated becomes equal to or greater than preset fastening torque, the control circuit section stops running the motor unit.

In the electric rotary tool of JP 2009-202317 A, it takes some time for the motor unit to stop running due to the inertial force of the motor unit. Thus, chances are that the electric rotary tool fastens a fastening member such as bolt or nut with fastening torque greater than preset fastening torque.

SUMMARY

The present disclosure discloses a technique for controlling an electric tool more accurately according to torque.

An electric tool according to an aspect of the present disclosure includes a motor, a holder, a transmission mechanism, a torque detector, an electronic clutch, and an inhibiting mechanism. The holder is configured to hold a tip tool thereon. The transmission mechanism transmits motive power of the motor to the holder. The torque detector detects a torque value about output torque provided by the tip tool. The electronic clutch is activated when a predetermined condition about the torque value detected by the torque detector is satisfied and thereby controls the motor to make the motor stop running. The inhibiting mechanism is interposed between the motor and the holder and inhibits transmission of inertial force from the motor to the holder in response to activation of the electronic clutch.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

An electric tool 100 according to an exemplary embodiment will now be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. The drawings to be referred to in the following description of embodiments are all schematic representations. Thus, the ratio of the dimensions (including thicknesses) of respective constituent elements illustrated on the drawings does not always reflect their actual dimensional ratio.

(1) OVERVIEW

Figure 1:
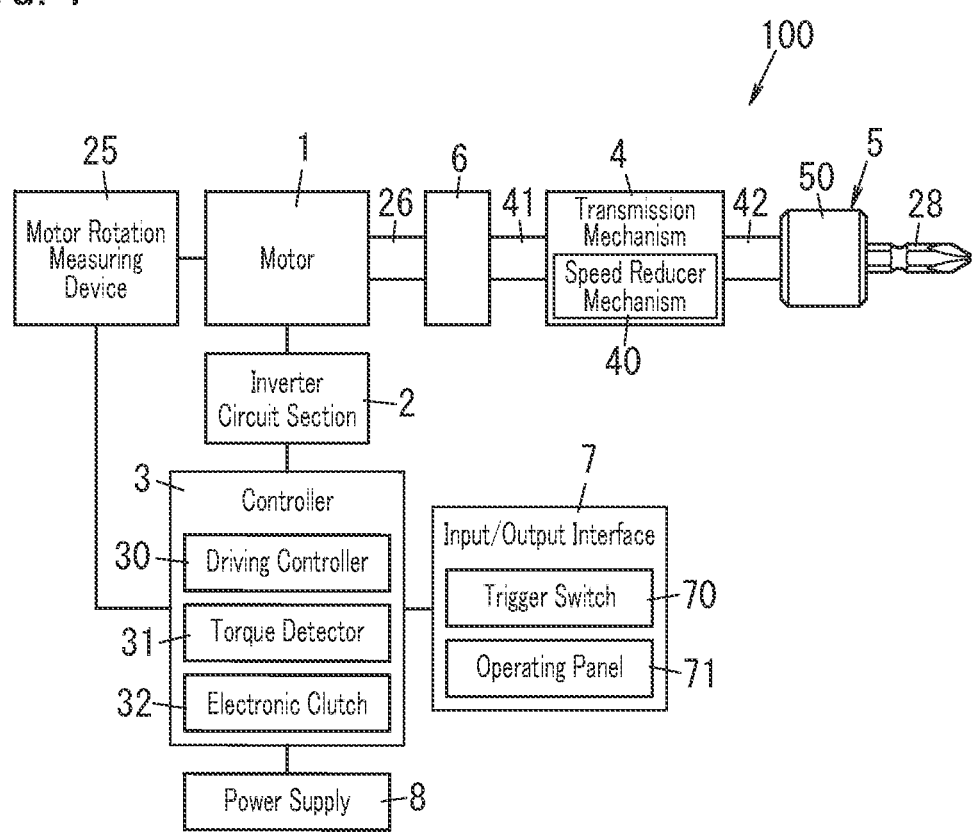
FIG. 1 is a block diagram of an electric tool according to an exemplary embodiment.

As shown in FIG. 1, an electric tool 100 according to this embodiment includes a motor 1, a holder 5, a transmission mechanism 4, a torque detector 31, and an electronic clutch 32. In this embodiment, the torque detector 31 and the electronic clutch 32 are provided for a controller 3.

The motor 1 runs (rotates) with the power supplied from a power supply 8 under the control of the controller 3.

The holder 5 is configured to hold a tip tool 28 thereon.

The transmission mechanism 4 transmits motive power of the motor 1 to the holder 5.

The torque detector 31 detects a torque value about output torque provided by the tip tool 28.

The electronic clutch 32 is activated when a predetermined condition about the torque value detected by the torque detector 31 is satisfied and thereby controls the motor 1 to make the motor 1 stop running. That is to say, the electric tool 100 according to this embodiment allows the controller 3 to make the motor 1 stop running when a predetermined condition is satisfied, i.e., enables performing so-called "electronic clutch control." Nevertheless, even if the electronic clutch 32 controls the motor 1 to make the motor 1 stop running, the motor 1 is going to continue turning for a while due to inertia of energy.

As shown in FIG. 1, the electric tool 100 according to this embodiment further includes an inertial force inhibiting mechanism (hereinafter simply referred to as an "inhibiting mechanism" for the sake of simplicity) 6.

The inhibiting mechanism 6 is interposed between the motor 1 and the holder 5. The inhibiting mechanism 6 inhibits transmission of inertial force from the motor 1 to the holder 5 in response to activation of the electronic clutch 32.

In the electric tool 100 according to this embodiment, as the motor 1 is controlled to stop running, the inhibiting mechanism 6 inhibits transmission of inertial energy from the motor 1 to the holder 5. This may reduce the chances of the holder 5 and the tip tool 28 turning continuously due to the inertia of energy of the motor 1. Thus, the electric tool 100 according to this embodiment enables reducing the chances of fastening a fastening member such as a bolt or a nut with excessive torque. This enables controlling the electric tool 100 more accurately according to the torque.

(2) DETAILS

Next, an electric tool 100 according to this embodiment will be described in further detail with reference to the accompanying drawings. The electric tool 100 may be used as, for example, an electric screwdriver, drill, drill-screwdriver, or wrench. Alternatively, the electric tool 100 may also be used as an electric saw, plane, nibbler, hole saw, or grinder, for example. In the following description of exemplary embodiments, a situation where the electric tool 100 is used as a screwdriver for tightening a fastening member such as a bolt or a nut will be described as a typical example.

(2.1) Overall Configuration

As shown in FIG. 1, the electric tool 100 includes the motor 1, an inverter circuit section 2, the controller 3, the transmission mechanism 4, the holder 5, the inhibiting mechanism 6, an input/output interface 7, the power supply 8, a current measuring device 110 (refer to FIG. 2), and a motor rotation measuring device 25. In addition, the electric tool 100 further includes a housing.

The housing includes a barrel, a grip, and an attachment. The barrel has a cylindrical shape. The inverter circuit section 2, the motor 1, and the transmission mechanism 4 are housed in the barrel. The grip protrudes from a side surface of the barrel. The grip has a cylindrical shape. The grip is a part to be gripped by the user. The grip houses the controller 3. The grip holds a trigger switch 70 of the input/output interface 7. To the attachment, the power supply 8 is attached removably. The attachment is provided at the tip of the grip (at the end opposite from the barrel). The attachment holds an operating panel 71 of the input/output interface 7.

Figure 2:
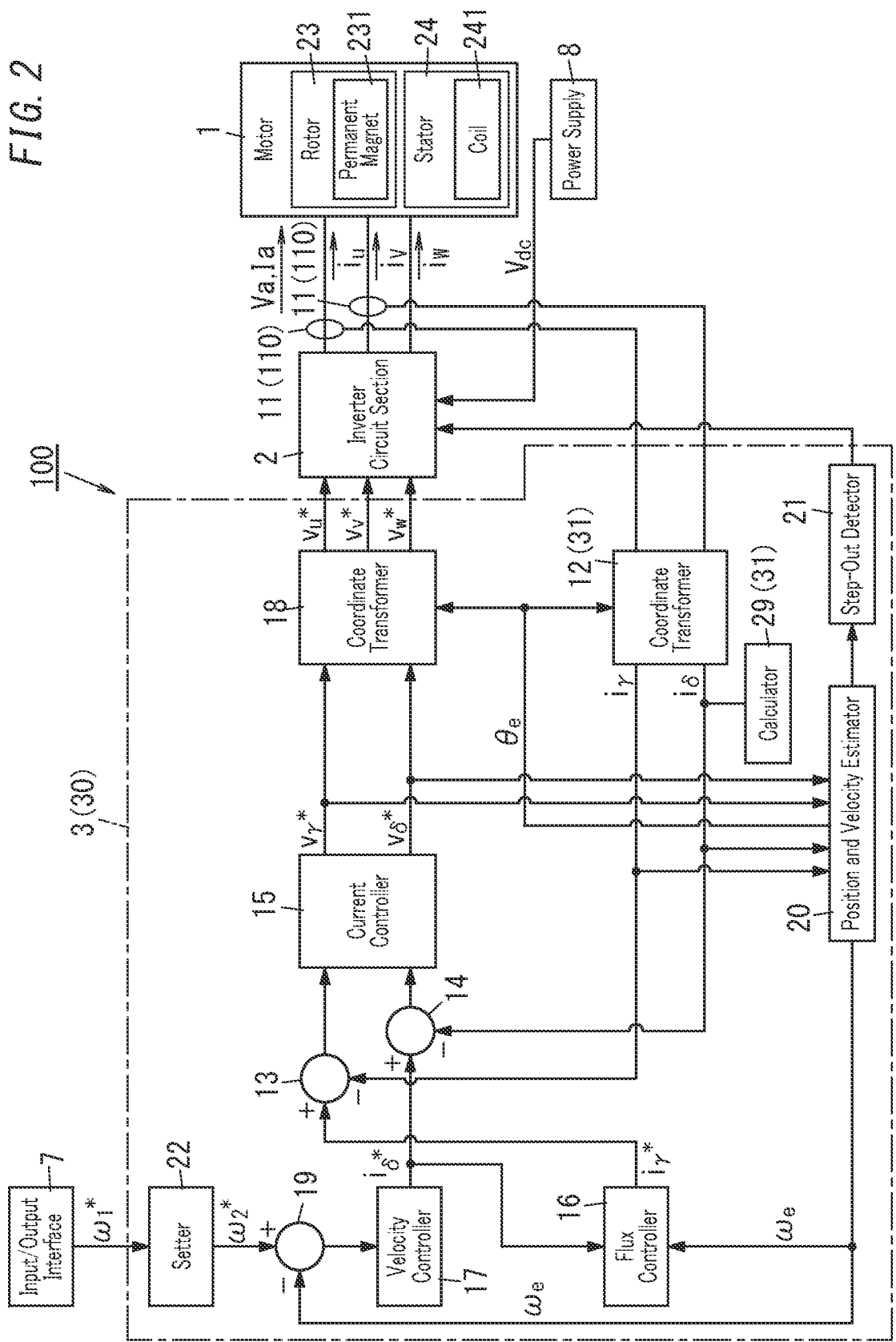
FIG. 2 is a circuit block diagram of the electric tool.

The motor 1 may be a brushless motor, for example. The motor 1 according to this embodiment is a synchronous motor. More specifically, the motor 1 may be a permanent magnet synchronous motor (PMSM). As shown in FIG. 2, the motor 1 includes a rotor 23 having a permanent magnet 231 and a stator 24 having a coil 241. The rotor 23 is coupled to a rotary shaft 26 (hereinafter referred to as a "first rotary shaft") (refer to FIG. 1) that outputs rotational power. The rotor 23 rotates with respect to the stator 24 due to electromagnetic interaction between the coil 241 and the permanent magnet 231.

The power supply 8 is a power supply for use to drive the motor 1. The power supply 8 is a DC power supply. In this embodiment, the power supply 8 includes a secondary battery. The power supply 8 is a so-called "battery pack." The power supply 8 may also be used as a power supply for the inverter circuit section 2 and the controller 3.

The inverter circuit section 2 is a circuit for driving the motor 1. The inverter circuit section 2 converts a voltage $V_{dc}$ supplied from the power supply 8 to a drive voltage Va for the motor 1. In this embodiment, the drive voltage Va is a three-phase AC voltage including a U-phase voltage, a V-phase voltage, and a W-phase voltage. In the following description, the U-, V-, and W-phase voltages will be hereinafter designated by $v_u$, $v_v$, and $v_w$, respectively, as needed. These voltages $v_u$, $v_v$, and $v_w$ are sinusoidal voltages.

The inverter circuit section 2 may be implemented using a PWM inverter and a PWM converter. The PWM converter generates a pulse-width modulated PWM signal in accordance with target values (voltage command values) $v_u^*$, $v_v^*$, $v_w^*$ of the drive voltage $V_a$ (including the U-phase voltage $v_u$, the V-phase voltage $v_v$, and the W-phase voltage $v_w$). The PWM inverter applies a drive voltage $V_a$ ($v_u$, $v_v$, $v_w$) corresponding to the PWM signal to the motor 1, thereby driving the motor 1. More specifically, the PWM inverter includes half-bridge circuits corresponding to the three phases and a driver. In the PWM inverter, the driver turns ON and OFF a switching element in each half-bridge circuit in response to the PWM signal, thereby applying the drive voltage $V_a$ ($v_u$, $v_v$, $v_w$) according to the voltage command values $v_u^*$, $v_v^*$, $v_w^*$ to the motor 1. As a result, the motor 1 is supplied with a drive current Ia corresponding to the drive voltage $V_a$ ($v_u$, $v_v$, $v_w$). The drive current Ia includes a U-phase current $i_u$, a V-phase current $i_v$, and a W-phase current $i_w$. More specifically, the U-phase current $i_u$, the V-phase current $i_v$, and the W-phase current $i_w$ are respectively a current flowing through U-phase armature winding, a current flowing through V-phase armature winding, and a current flowing through W-phase armature winding in the stator 24 of the motor 1.

The current measuring device 110 includes two phase current sensors 11. In this embodiment, the two phase current sensors 11 respectively measure the U-phase current $i_u$, and the V-phase current $i_v$ out of the drive current Ia supplied from the inverter circuit section 2 to the motor 1. Note that the W-phase current $i_w$ may be calculated based on the U-phase current $i_u$, and the V-phase current $i_v$. Alternatively, the current measuring device 110 may include a current detector that uses a shunt resistor, for example, instead of the phase current sensors 11.

Figure 4:
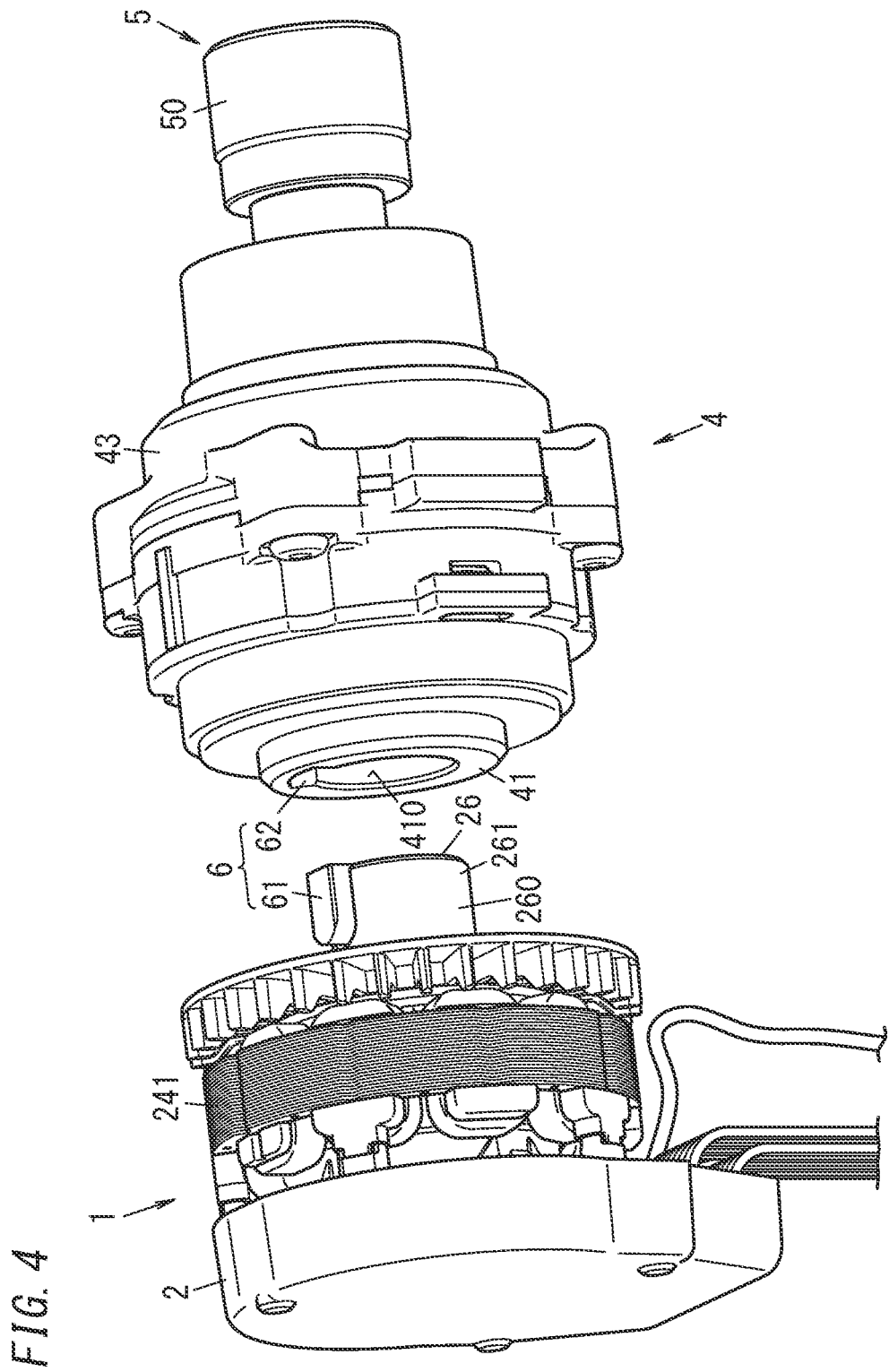
FIG. 4 is an exploded perspective view of a main part of the electric tool.
Figure 5:
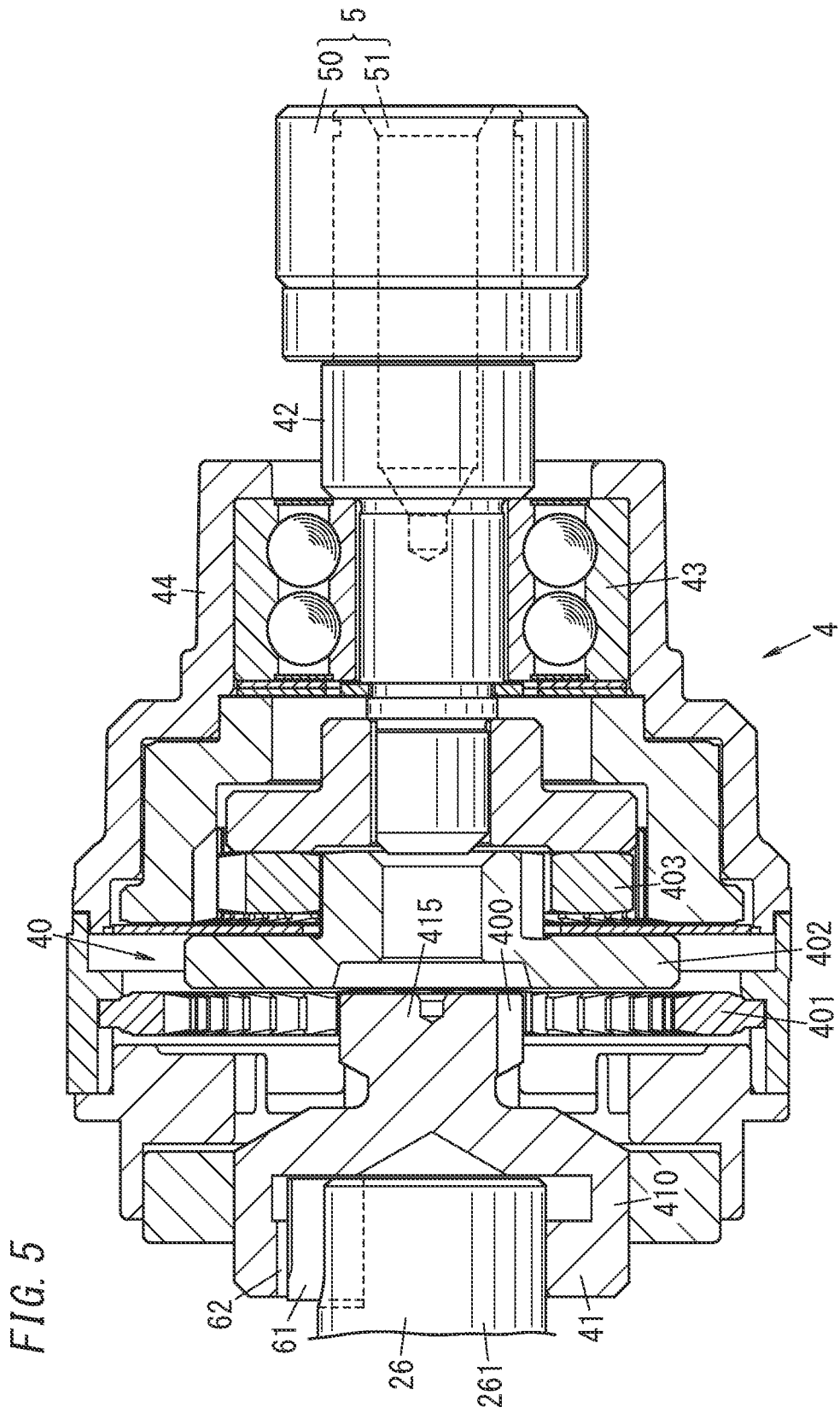
FIG. 5 is a cross-sectional view of the main part of the electric tool.

As shown in FIGS. 1 and 4, the transmission mechanism 4 is interposed between the rotary shaft (first rotary shaft) 26 of the motor 1 and the holder 5. The transmission mechanism 4 transmits the motive power of the motor 1 to the holder 5. As shown in FIGS. 4 and 5, the transmission mechanism 4 may include, for example, a speed reducer mechanism 40, a rotary shaft (hereinafter referred to as a "second rotary shaft") 41, an output shaft 42, a bearing 43, and a case 44.

The second rotary shaft 41 is coupled to the first rotary shaft 26 to turn along with the first rotary shaft 26 when the rotary shaft (first rotary shaft) 26 of the motor 1 turns. The second rotary shaft 41 turns along with the first rotary shaft 26 while keeping in contact with the first rotary shaft 26.

The speed reducer mechanism 40 reduces the rotational velocity of the second rotary shaft 41 and transmits the torque of the second rotary shaft 41 to the output shaft 42. The speed reducer mechanism 40 includes a sun gear 400 provided for the second rotary shaft 41 and a three-stage planetary gear speed reducer mechanism (including a first planetary gear 401, a second planetary gear 402, and a third planetary gear 403) meshing with the sun gear 400. The speed reducer mechanism 40 may change the gear ratio in response to, for example, an operation performed on a speed selector switch provided for the housing.

The torque of the second rotary shaft 41 is transmitted to the output shaft 42 via the speed reducer mechanism 40. That is to say, the output shaft 42 turns with the motive power of the motor 1.

The bearing 43 holds the output shaft 42 rotatably. The case 44 holds the speed reducer mechanism 40, the second rotary shaft 41, and the bearing 43.

As shown in FIG. 1, the holder 5 holds the tip tool 28 thereon. As shown in FIG. 5, the holder 5 has a chuck 50 and a bit attachment hole 51 provided through the tip of the output shaft 42. The tip tool 28 is fitted into the bit attachment hole 51 and fixed (attached) to the output shaft 42 via the chuck 50.

As shown in FIG. 1, the tip tool 28 is held by the holder 5 and rotates along with the holder 5. The electric tool 100 rotates the tip tool 28 by turning the output shaft 42 with the driving force of the motor 1. In other words, the electric tool 100 is a tool for driving the tip tool 28 with the driving force of the motor 1. Among various types of tip tools 28, a tip tool 28 is selected according to the intended use and attached to the holder 5 for use. Although the tip tool 28 is replaceable depending on the intended use in the electric tool 100 according to this embodiment, the tip tool 28 does not have to be replaceable but may be fixed integrally to the output shaft 42. Examples of the tip tool 28 include a screwdriver bit, a drill bit, and a socket. In the example shown in FIG. 1, the tip tool 28 is a screwdriver bit.

The input/output interface 7 is a user interface. The input/output interface 7 includes devices for use to display information about the operation of the electric tool 100, enter settings about the operation of the electric tool 100, and operate the electric tool 100.

As shown in FIG. 1, in the electric tool 100 according to this embodiment, the input/output interface 7 includes a trigger switch (trigger volume) 70 and an operating panel 71 for accepting the user's operating command.

The trigger switch 70 is a type of push button switch. The motor 1 may be turned ON and OFF by performing the operation of pulling the trigger switch 70. In addition, the target value $\omega_1^*$ of the velocity of the motor 1 may be changed by the manipulative variable of the operation of pulling the trigger switch 70. As a result, the velocity of the motor 1 and the output shaft 42 may be adjusted by the manipulative variable of the operation of pulling the trigger switch 70. The deeper the trigger switch 70 is pulled (i.e., the larger the manipulative variable is), the higher the velocity of the motor 1 and the output shaft 42 becomes.

The trigger switch 70 may include, for example, a multi-stage switch or a continuously variable switch (variable resistor) for outputting an operating signal. The operating signal varies according to the manipulative variable of the trigger switch 70 (i.e., how deep the trigger switch 70 is pulled).

The input/output interface 7 determines the target value $\omega_1^*$ in response to the operating signal supplied from the trigger switch 70 and provides the target value $\omega_1^*$ to the controller 3. The controller 3 starts or stops running the motor 1, and controls the velocity of the motor 1, in accordance with the target value $\omega_1^*$ supplied from the input/output interface 7.

The operating panel 71 is operated by the user. The operating panel 71 has the function of setting a threshold value. The operating panel 71 includes, for example, two operating buttons (namely, an up button and a down button) for use to set the threshold value and a display device. The threshold value may be selected from a plurality of candidate threshold values. The display device displays a currently selected candidate threshold value thereon. For example, when the up button is pressed, the value displayed on the display device increases. When the down button is pressed, the value displayed on the display device decreases. The operating panel 71 outputs, as the threshold value, the candidate threshold value displayed on the display device to the controller 3.

The motor rotation measuring device 25 measures the rotational angle of the motor 1. As the motor rotation measuring device 25, either a photoelectric encoder or a magnetic encoder may be adopted, for example. Based on the rotational angle of the motor 1 as measured by the motor rotation measuring device 25 and its variation, the rotor position θ and the velocity ω of the (rotor 23 of the) motor 1 may be determined.

The controller 3 includes a computer system including one or more processors and a memory. At least some of the functions of the controller 3 are performed by making the processor of the computer system execute a program stored in the memory of the computer system. The program may be stored in advance in the memory. Alternatively, the program may also be downloaded via a telecommunications line such as the Internet or distributed after having been stored in a non-transitory storage medium such as a memory card.

The controller 3 controls the operation of the motor 1 in accordance with the target value $\omega_1^*$ supplied from the input/output interface 7.

(2.2) Controller

Next, the controller 3 will be described in further detail.

As shown in FIG. 1, the controller 3 includes a driving controller 30, a torque detector 31, and the electronic clutch 32. The driving controller 30, the torque detector 31, and the electronic clutch 32 represent respective functions to be performed by the controller 3.

The driving controller 30 controls the inverter circuit section 2 to have a drive current Ia supplied from the inverter circuit section 2 to the motor 1 and thereby have the motor 1 driven. More specifically, the driving controller 30 determines a command value $\omega_2^*$ of the velocity of the motor 1 based on the target value $\omega_1^*$ of the velocity of the motor 1 that has been provided by the trigger switch 70. In addition, the driving controller 30 also determines the target values (voltage command values) $v_u^*$, $v_v^*$, and $v_w^*$ of the drive voltage Va such that the velocity of the motor 1 agrees with the command value $\omega_2^*$ and gives the target values to the inverter circuit section 2. In response, the inverter circuit section 2 supplies the drive voltage Va to the motor 1 in accordance with the target values of the drive voltage Va that the inverter circuit section 2 has received from the driving controller 30.

In the electric tool 100 according to this embodiment, the driving controller 30 controls the motor 1 by vector control. The vector control is a type of motor control method in which a motor current is broken down into a current component that generates torque (rotational force) and a current component that generates a magnetic flux and in which these current components are controlled independently of each other.

Figure 3:
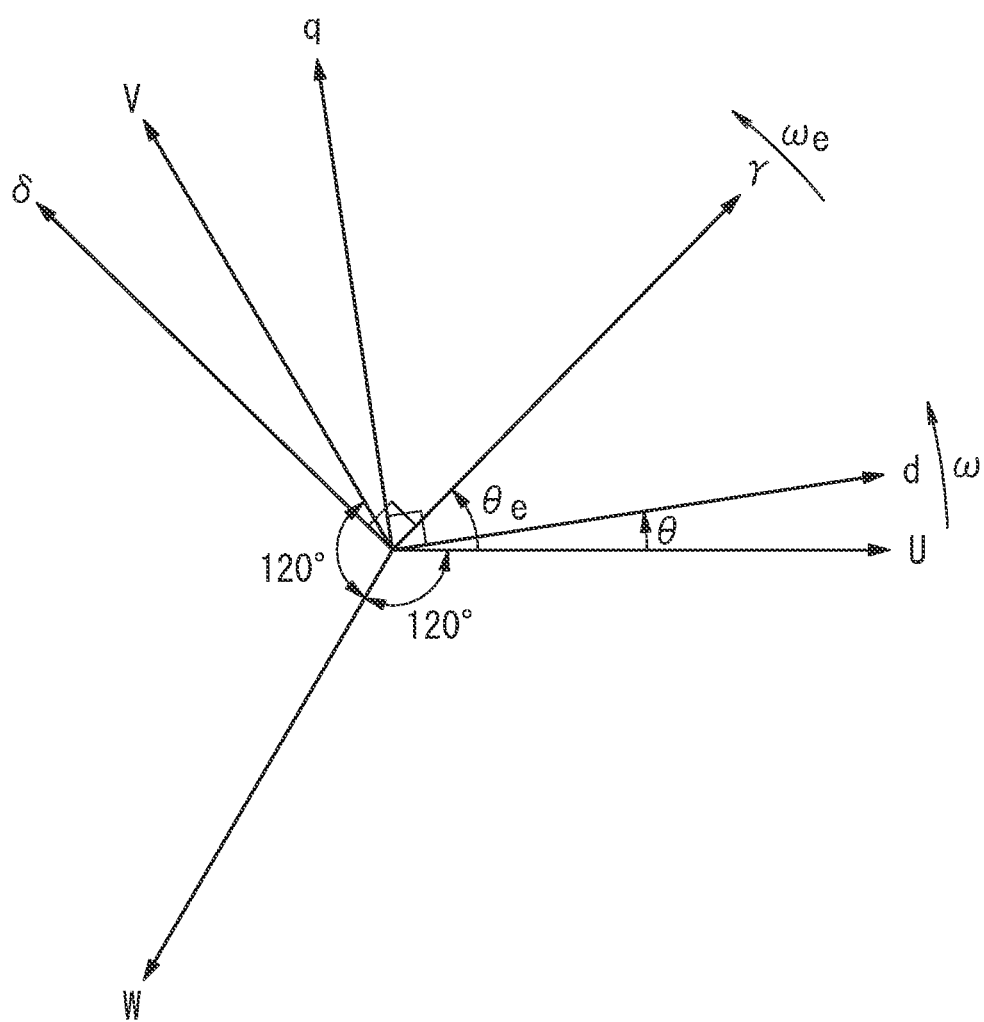
FIG. 3 illustrates how a controller of the electric tool performs control.

FIG. 3 shows an analysis model of the motor 1 according to the vector control. In FIG. 3, shown are armature winding fixed axes for the U-, V-, and W-phases. According to the vector control, a rotational coordinate system, rotating at as high a velocity as the rotational velocity of a magnetic flux generated by the permanent magnet 231 provided for the rotor 23 of the motor 1, is taken into account. In the rotational coordinate system, the direction of the magnetic flux generated by the permanent magnet 231 is defined by a d-axis and a rotational axis corresponding in control to the d-axis is defined by a γ-axis. A q-axis is set at a phase leading by an electrical angle of 90 degrees with respect to the d-axis. A δ-axis is set at a phase leading by an electrical angle of 90 degrees with respect to the γ-axis. The rotational coordinate system corresponding to real axes is a coordinate system, for which the d-axis and q-axis are selected as its coordinate axes (which will be hereinafter referred to as "dq axes"). The rotational coordinate system in control is a coordinate system, for which the γ-axis and δ-axis are selected as its coordinate axes (which will be hereinafter referred to as "γδ axes").

The dq axes have rotated and their rotational velocity is designated by ω. The γδ axes have also rotated and their rotational velocity is designated by ωe. Also, in the dq axes, the d-axis angle (phase) as viewed from the U-phase armature winding fixed axis is designated by θ. In the same way, in the γδ axes, the γ-axis angle (phase) as viewed from the U-phase armature winding fixed axis is designated by θe. The angles designated by θ and θe are angles as electrical angles and are generally called "rotor positions" or "magnetic pole positions." The rotational velocities designated by w and ωe are angular velocities represented by electrical angles. In the following description, θ or θe will be hereinafter sometimes referred to as a "rotor position" and ω or ωe will be hereinafter simply referred to as a "velocity."

Basically, the driving controller 30 performs the vector control such that 0 and θe agree with each other. If θ and θe agree with each other, the d-axis and the q-axis agree with the γ-axis and the δ-axis, respectively. In the following description, the γ-axis component and δ-axis component of the drive voltage Va will be represented as needed by a γ-axis voltage $v_γ$ and a δ-axis voltage $v_δ$, respectively, and the γ-axis component and δ-axis component of the drive current Ia will be represented as needed by a γ-axis current $i_γ$ and a δ-axis current $i_δ$, respectively.

Also, voltage command values representing the respective target values of the γ-axis voltage $v_γ$ and the δ-axis voltage $v_δ$ will be represented by a γ-axis voltage command value $v_γ^*$ and a δ-axis voltage command value $v_δ^*$, respectively. Furthermore, current command values representing the respective target values of the γ-axis current $i_γ$ and the δ-axis current $i_δ$ will be represented by a γ-axis current command value $i_γ^*$ and a δ-axis current command value $i_δ^*$, respectively.

The driving controller 30 performs the vector control to make the values of the γ-axis voltage $v_γ$ and δ-axis voltage $v_δ$ follow the γ-axis voltage command value $v_γ^*$ and the δ-axis voltage command value $v_δ^*$, respectively, and to make the values of the γ-axis current $i_γ$ and δ-axis current $i_δ$ follow the γ-axis current command value $i_γ^*$ and the δ-axis current command value $i_δ^*$, respectively.

As shown in FIG. 2, the driving controller 30 includes a coordinate transformer 12, a subtractor 13, another subtractor 14, a current controller 15, a flux controller 16, a velocity controller 17, another coordinate transformer 18, still another subtractor 19, a position and velocity estimator 20, a step-out detector 21, and a setter 22. Note that the coordinate transformer 12, the subtractors 13,14, 19, the current controller 15, the flux controller 16, the velocity controller 17, the coordinate transformer 18, the position and velocity estimator 20, the step-out detector 21, and the setter 22 represent respective functions to be performed by the driving controller 30 (controller 3). Thus, the respective constituent elements of the driving controller 30 may freely use the respective values generated inside the driving controller 30.

The setter 22 generates a command value $ω_2^*$ of the velocity of the motor 1. The setter 22 determines the command value $ω_2^*$ based on the target value $ω_1^*$ provided by the input/output interface 7 and other values.

The coordinate transformer 12 performs, based on the rotor position θe, coordinate transformation on the U-phase current $i_u$, and the V-phase current $i_v$ on the γδ axes, thereby calculating and outputting a γ-axis current $i_γ$ and a δ-axis current $i_δ$. As used herein, the γ-axis current $i_γ$ is a type of excitation current corresponding to the d-axis current and hardly contributing to torque. On the other hand, the δ-axis current $i_δ$ is a current corresponding to the q-axis current and significantly contributing to torque. The rotor position θe is calculated by the position and velocity estimator 20.

The subtractor 19 refers to the velocity ωe and the command value $ω_2^*$ and calculates a velocity deviation $(ω_2^*-ωe)$ between the velocity ωe and the command value $ω_2^*$. The velocity ωe is calculated by the position and velocity estimator 20.

The velocity controller 17 calculates a δ-axis current command value $i_δ^*$ by proportional integral control, for example, such that the velocity deviation $(ω_2^*-ωe)$ converges toward zero and outputs the δ-axis current command value $i_δ^*$ thus calculated.

The flux controller 16 determines a γ-axis current command value $i_γ^*$ and outputs the γ-axis current command value $i_γ^*$ to the subtractor 13. The γ-axis current command value $i_γ^*$ may have any of various values according to the type of the vector control performed by the controller 3 and the velocity w of the motor 1, for example. If the maximum torque control is performed with the d-axis current set at zero, for example, then the γ-axis current command value $i_γ^*$ is set at zero. On the other hand, if a flux weakening control is performed with a d-axis current allowed to flow, then the γ-axis current command value $i_γ^*$ is set at a negative value corresponding to the velocity ωe. In the following description, a situation where the γ-axis current command value $i_γ^*$ is zero will be described.

The subtractor 13 subtracts the γ-axis current $i_γ$ provided by the coordinate transformer 12 from the γ-axis current command value $i_γ^*$ provided by the flux controller 16, thereby calculating a current error $(i_γ^*-i_γ)$. The subtractor 14 subtracts the δ-axis current $i_δ$ provided by the coordinate transformer 12 from the value $i_δ^*$ provided by the velocity controller 17, thereby calculating a current error $(i_δ^*-i_δ)$.

The current controller 15 performs current feedback control by proportional integral control, for example, such that both the current errors $(i_γ^*-i_γ)$ and $(i_δ^*-i_δ)$ converge toward zero. In this case, the current controller 15 calculates a γ-axis voltage command value $v_γ^*$ and a δ-axis voltage command value $v_δ^*$ by using non-interference control to eliminate interference between the γ-axis and the δ-axis such that both $(i_γ^*-i_γ)$ and $(i_δ^*-i_δ)$ converge toward zero.

The coordinate transformer 18 performs, based on the rotor position θe provided by the position and velocity estimator 20, coordinate transformation on the γ-axis voltage command value $v_γ^*$ and the δ-axis voltage command value $v_δ^*$ provided by the current controller 15 on three-phase fixed coordinate axes, thereby calculating and outputting voltage command values $(v_u^*, v_v^*,$ and $v_w^*)$.

The inverter circuit section 2 supplies, to the motor 1, three-phase voltages corresponding to the voltage command values $(v_u^*, v_v^*,$ and $v_w^*)$ provided by the coordinate transformer 18. In response, the motor 1 is driven with the power (three-phase voltages) supplied from the inverter circuit section 2 and generates rotational power.

The position and velocity estimator 20 estimates the rotor position θe and the velocity ωe. More specifically, the position and velocity estimator 20 may perform, for example, proportional integral control using some or all of $i_γ$ and $i_δ$ provided by the coordinate transformer 12 and $v_γ^*$ and $v_\delta^*$ provided by the current controller 15. The position and velocity estimator 20 estimates, using the rotational angle θ of the motor 1 as measured by the motor rotation measuring device 25, the rotor position θe and the velocity ωe such that the axial error (θe−θ) between the d-axis and the γ-axis converges toward zero. Note that various methods for estimating the rotor position θe and the velocity ωe have been proposed in the art. The position and velocity estimator 20 may adopt any of those various known methods.

The step-out detector 21 determines whether a step-out (out of synchronism) has occurred in the motor 1. More specifically, the step-out detector 21 determines, based on the magnetic flux of the motor 1, whether a step-out has occurred in the motor 1. The magnetic flux of the motor 1 may be determined based on the d-axis current, the q-axis current, the γ-axis voltage command value $v_\gamma^*$, and the δ-axis voltage command value $v_\delta^*$. When finding the amplitude of the magnetic flux of the motor 1 less than a threshold value, the step-out detector 21 may decide that a step-out have occurred in the motor 1. Note that the threshold value may be determined as appropriate based on the amplitude of the magnetic flux generated by the permanent magnet 231 of the motor 1. Various known methods for detecting the step-out have been proposed in the art. The step-out detector 21 may adopt any of those various known methods.

In this manner, the driving controller 30 determines, based on the target value $\omega_1^*$ supplied from the input/output interface 7 (trigger switch 70), the target values (voltage command values) $v_u^*$, $v_v^*$, $v_w^*$ of the drive voltage $V_a$ (including the U-phase voltage $v_u$, the V-phase voltage $v_v$, and the W-phase voltage $v_w$) and supplies the target values to the inverter circuit section 2 to have the motor 1 start turning.

The torque detector 31 detects a torque value about the output torque provided by the tip tool 28. The torque detector 31 detects the torque value based on, for example, a current flowing through the motor 1.

The torque detector 31 may be implemented as the above-described coordinate transformer 12 and a calculator 29. The torque detector 31 may further include the above-described current measuring device 110.

The coordinate transformer 12 receives the measured values of two-phase currents (namely, the U-phase current $i_u$, and the V-phase current $i_v$) as measured by the current measuring device 110 (i.e., the two phase current sensors 11) out of the drive current Ia to be supplied to the motor 1. The coordinate transformer 12 performs coordinate transformation on the measured values of the two phase currents as measured by the current measuring device 110, thereby obtaining a γ-axis current $i_\gamma$ (excitation current) and a δ-axis current $i_\delta$ (torque current) flowing through the motor 1.

The coordinate transformer 12 calculates the γ-axis current $i_\gamma$ and the δ-axis current $i_\delta$ by performing, based on the rotor position θe, coordinate transformation on the measured values of the U-phase current $i_u$ and the V-phase current $i_v$ as measured by the current measuring device 110.

The calculator 29 calculates the torque value. The calculator 29 detects, based on the δ-axis current $i_\delta$ (torque current) obtained by the coordinate transformer 12, a torque value about the output torque provided by the tip tool 28. The calculator 29 may calculate the torque value by, for example, multiplying the value of the δ-axis current $i_\delta$ by a predetermined constant.

As used herein, the "torque value about the output torque provided by the tip tool 28" to be detected by the torque detector 31 may be a value of the torque produced by the motor 1, a value of the torque produced by the holder 5, or a value of the torque produced by a constituent member (i.e., the transmission mechanism 4) that transmits the torque of the motor 1 to the holder 5, whichever is appropriate.

In this manner, the torque detector 31 calculates, based on a torque current flowing through the motor 1 (i.e., the δ-axis current $i_\delta$), the torque value about the output torque provided by the tip tool 28. The torque detector 31 calculates the torque value based on the torque current (δ-axis current $i_\delta$) for use in the vector control, thus allowing a part of a circuit for vector control and a part of a circuit for calculating the torque value to be shared. This contributes to reducing the area and dimensions of a circuit provided for the electric tool 100 and cutting down the cost required for the circuit.

The electronic clutch 32 is activated when a predetermined condition about the torque value detected by the torque detector 31 is satisfied and thereby controls the motor 1 to make the motor 1 stop running. As used herein, the expression "the electronic clutch 32 is activated" means that the controller 3 controls the inverter circuit section 2 to make the motor 1 stop running.

The "predetermined condition" for activating the electronic clutch 32 includes a condition that the torque value detected by the torque detector 31 be greater than a threshold value set by the operating panel 71.

Specifically, the predetermined condition may be, for example, a condition that the torque value detected be greater than a threshold value. Alternatively, the predetermined condition may also be, for example, a condition that the state where the torque value detected is greater than the threshold value last for a predetermined time or more. Still alternatively, the predetermined condition may even be, for example, that in a situation where the torque detector 31 detects the torque value at predetermined time intervals, the torque value detected be greater than the threshold value at least a predetermined number of times.

The electronic clutch 32 may be implemented as, for example, the setter 22 described above. The setter 22 generates, when the predetermined condition is satisfied, a command value $\omega_2^*$ for the velocity of the motor 1 to make the motor 1 stop running. However, this is only an example and should not be construed as limiting. Alternatively, the electronic clutch 32 may include at least one selected from the group consisting of the current controller 15, the flux controller 16, the velocity controller 17, and the coordinates controller 18. For example, the flux controller 16 and the velocity controller 17 serving as the electronic clutch 32 may determine, when the predetermined condition is satisfied, the γ-axis current command value $i_\gamma^*$ and the δ-axis current command value $i_\delta^*$ to make the drive current Ia to be supplied to the motor 1 equal to zero and output the γ-axis current command value $i_\gamma^*$ and the δ-axis current command value $i_\delta^*$.

The electronic clutch 32 may perform the control to make the velocity of the motor 1 equal to zero or to make the drive current Ia to be supplied to the motor 1 equal to zero, whichever is appropriate.

(2.3) Inhibiting Mechanism

The inhibiting mechanism 6 inhibits transmission of inertial force from the motor 1 to the holder 5 in response to activation of the electronic clutch 32.

Figure 6:
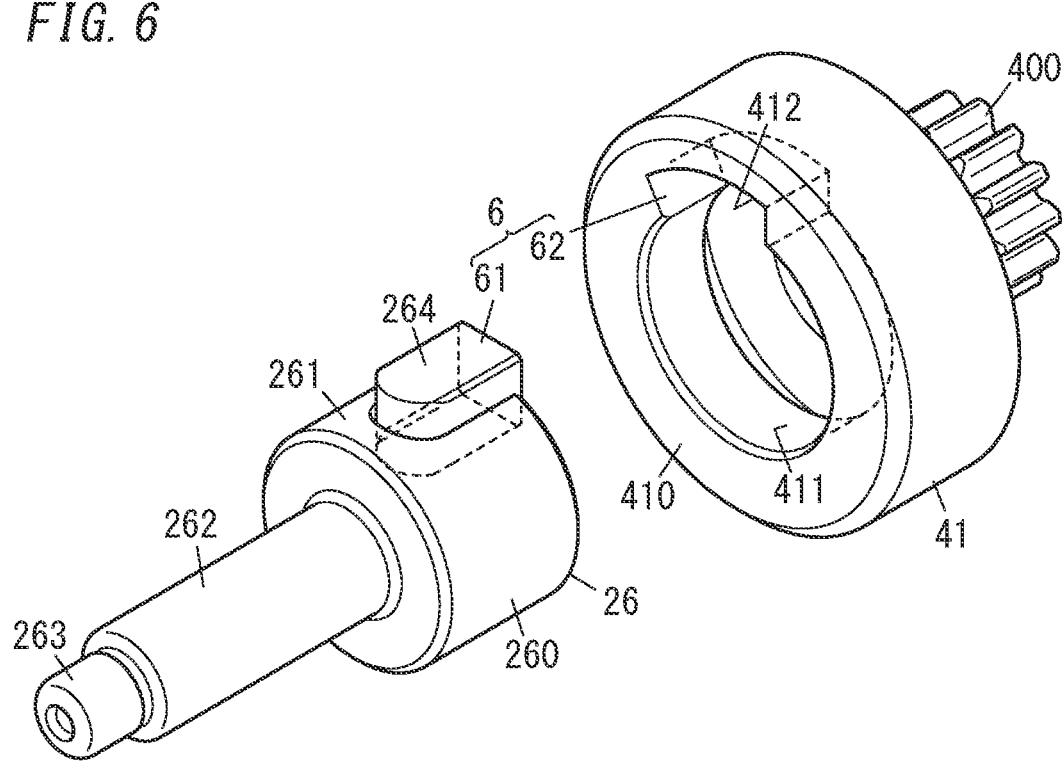
FIG. 6 is an exploded perspective view of the main part of the electric tool.

As shown in FIG. 1, in the electric tool 100 according to this embodiment, the inhibiting mechanism 6 is interposed between the motor 1 and the speed reducer mechanism 40 of the transmission mechanism 4. As shown in FIGS. 4 and 6, the inhibiting mechanism 6 includes a first structure 61 provided for the first rotary shaft 26 of the motor 1 and a second structure 62 provided for the second rotary shaft 41 of the transmission mechanism 4. In the electric tool 100 according to this embodiment, the inhibiting mechanism 6 inhibits transmission of inertial force from the motor 1 to the speed reducer mechanism 40 in response to the activation of the electronic clutch 32.

As shown in FIG. 6, the first rotary shaft 26 includes, as integral parts thereof, a shaft body 260 and an engaging projection 264.

The shaft body 260 has a shape in which three circular columnar parts having mutually different diameters (namely, a first circular columnar portion 261, a second circular columnar portion 262, and a third circular columnar portion 263) are arranged side by side in the axial direction and are coaxially coupled to each other. In the example shown in FIG. 6, the first circular columnar portion 261 has a larger diameter than the second circular columnar portion 262 and the second circular columnar portion 262 has a larger diameter than the third circular columnar portion 263. The shaft body 260 is fixed to the rotor 23 of the motor 1 such that the third circular columnar portion 263 is located adjacent to the rotor 23 and the first circular columnar portion 261 is located distant from the rotor 23 as shown in FIG. 4. The shaft body 260 turns along with the rotor 23, for example.

As shown in FIG. 6, the engaging projection 264 protrudes from a side surface of the shaft body 260 (more specifically, from the side surface of the first circular columnar portion 261) along the radius of the shaft body 260. When viewed along a virtual plane intersecting at right angles with the axis of the shaft body 260, the engaging projection 264 may have a rectangular cross section, for example (refer to FIG. 7).

As shown in FIGS. 5 and 6, the second rotary shaft 41 includes, as integral parts thereof, a shaft body 410 and a gear portion 415.

As shown in FIG. 6, the shaft body 410 has the shape of a bottomed circular cylinder, one bottom surface of which is open. The shaft body 410 has a circular columnar receiving recess 411, which is provided through the open bottom surface. The (inside)diameter of the receiving recess 411 is approximately equal to (specifically, slightly larger than) the diameter of the first circular columnar portion 261 of the first rotary shaft 26 of the motor 1.

Figure 7:
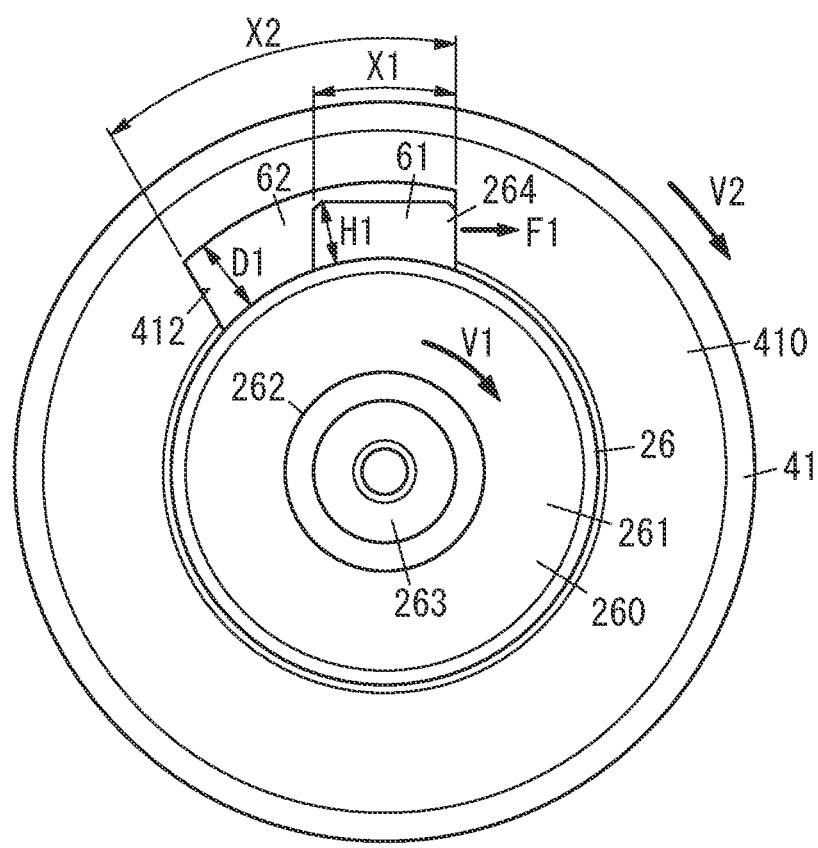
FIG. 7 is a side view of the main part of the electric tool.

The shaft body 410 further has an engaging recess 412, which is recessed from the side surface of the receiving recess 411 radially outward. The engaging recess 412 generally has the shape of a fan, which is coaxial with the receiving recess 411. As shown in FIG. 7, the depth D1 of the engaging recess 412 (i.e., a dimension measured along the radius of the shaft body 410) is greater than the dimension H1 of the protruding part of the engaging projection 264 (i.e., a dimension measured along the radius of the shaft body 260). A circumferential dimension X2 of the engaging recess 412 (i.e., a dimension, measured along the circumference of the shaft body 410, of the engaging recess 412) is greater than a circumferential dimension X1 of the engaging projection 264 (i.e., a dimension, measured along the circumference of the shaft body 260, of the engaging projection 264). In the example shown in FIG. 7, the circumferential dimension X2 of the engaging recess 412 is about twice as large as the circumferential dimension X1 of the engaging projection 264.

As shown in FIGS. 5 and 6, the gear portion 415 is fixed coaxially onto the bottom surface of the shaft body 410. The gear portion 415 is provided with the sun gear 400.

As shown in FIGS. 5 and 7, in the electric tool 100 according to this embodiment, the first circular columnar portion 261 of the first rotary shaft 26 is fitted coaxially into the receiving recess 411 of the second rotary shaft 41. At this time, as shown in FIG. 7, the engaging projection 264 of the first rotary shaft 26 is received within the engaging recess 412 of the second rotary shaft 41.

The second rotary shaft 41 may turn integrally with the first rotary shaft 26 with the first circular columnar portion 261 thereof fitted into the receiving recess 411. As the first rotary shaft 26 turns clockwise in FIG. 7, for example, with the torque applied by the motor 1 running, a first side surface (i.e., the right side surface in FIG. 7) of the engaging projection 264 of the first rotary shaft 26 comes into contact with a first side surface (i.e., the right side surface in FIG. 7) of the engaging recess 412 of the second rotary shaft 41. In this manner, the first rotary shaft 26 applies force F1, causing the second rotary shaft 41 to turn clockwise, to the second rotary shaft 41. As a result, the second rotary shaft 41 turns clockwise in FIG. 7 integrally with the first rotary shaft 26. In this state, torque is transmitted from the motor 1 to the holder 5 via the transmission mechanism 4. In that case, the rotational velocity V2 of the second rotary shaft 41 is as high as the rotational velocity V1 of the first rotary shaft 26.

The electric tool 100 according to this embodiment includes the electronic clutch 32 as described above. When the predetermined condition is satisfied, the electronic clutch 32 is activated and controls the motor 1 to make the motor 1 stop running. The electronic clutch 32 stops running the motor 1 by, for example, cutting off the supply of the drive current Ia to the motor 1. Even if the supply of the drive current Ia to the motor 1 is cut off, the motor 1 is still going to continue turning for a while due to inertia of energy. Likewise, the transmission mechanism 4, the holder 5, and the tip tool 28 are also going to continue turning for a while due to inertia of energy.

Next, an electric tool according to a comparative example will be described. The electric tool according to the comparative example has the same configuration as the electric tool 100 according to the exemplary embodiment but the first rotary shaft and second rotary shaft of the former electric tool are integrated with each other, which is a difference from the electric tool 100 according to the exemplary embodiment. More specifically, in the electric tool according to the comparative example, a sun gear is provided at the tip of the rotary shaft of the motor.

In the electric tool according to the comparative example, even if the electronic clutch is activated and the motor is controlled to stop running by cutting off the supply of the drive current to the motor, a rotator, including the motor, the transmission mechanism, the holder, and the tip tool, still continues rotating integrally for a while due to the inertial energy of the rotator. Thus, in the electric tool according to the comparative example, even after the electronic clutch has been activated, the fastening member such as a screw, a bolt, or a nut will be further fastened due to the inertial energy of the rotator including the motor. Thus, the electric tool according to the comparative example increases the chances of fastening the fastening member with fastening torque greater than the fastening torque (i.e., preset fastening torque) corresponding to the torque value detected by the torque detector, thus possibly causing a decline in the control accuracy of the electric tool according to the torque.

In contrast, in the electric tool 100 according to this embodiment, the motor 1 includes the rotary shaft (first rotary shaft) 26 and the transmission mechanism 4 includes the rotary shaft (second rotary shaft) 41 that turns integrally with the first rotary shaft 26 while keeping in contact with the first rotary shaft 26. That is to say, the second rotary shaft 41 may assume the state where the second rotary shaft 41 turns integrally with the first rotary shaft 26 while keeping in contact with the first rotary shaft 26 and the state where the second rotary shaft 41 turns separately out of contact with the first rotary shaft 26. In addition, the first rotary shaft 26 includes the engaging projection 264 that protrudes radially and the second rotary shaft 41 has the engaging recess 412 that is recessed radially and receives the engaging projection 264. The circumferential dimension X2 of the engaging recess 412 is greater than the circumferential dimension X1 of the engaging projection 264.

In the electric tool 100 according to this embodiment having such a configuration, the motor 1 is controlled to stop running in response to activation of the electronic clutch 32 to decelerate the first rotary shaft 26. When the velocity V1 of the first rotary shaft 26 becomes lower than the velocity V2 of the second rotary shaft 41, the engaging projection 264 of the first rotary shaft 26 comes out of contact with the first side surface of the engaging recess 412 of the second rotary shaft 41. After coming out of contact with the first side surface of the engaging recess 412, the engaging projection 264 relatively moves counterclockwise in FIG. 7 within the engaging recess 412 (refer to FIG. 8). Once the engaging projection 264 has come out of contact with the first side surface of the engaging recess 412, no force is transmitted any longer from the first rotary shaft 26 to the second rotary shaft 41. Thus, even if the first rotary shaft 26 continues to turn clockwise in FIG. 7, the inertial force of the motor 1 is no longer transmitted to the second rotary shaft 41.

In summary, in the electric tool 100 according to this embodiment, if the motor 1 is controlled to stop running in response to activation of the electronic clutch 32, then the inertial force transmitted from the motor 1 to the transmission mechanism 4 is reduced. In other words, transmission of inertial force from the motor 1 to the transmission mechanism 4 is inhibited. This may reduce the chances of the holder 5 and the tip tool 28 turning continuously due to the inertial energy of the motor 1 transmitted from the motor 1 to the holder 5 and the tip tool 28. Thus, the electric tool 100 enables reducing the chances of fastening a fastening member with excessive torque. This enables controlling the electric tool 100 more accurately according to the torque.

In the electric tool 100 according to this embodiment, the inhibiting mechanism 6 for inhibiting transmission of inertial force from the motor 1 to the holder 5 in response to activation of the electronic clutch 32 is formed by the first structure 61 provided for the first rotary shaft 26 of the motor 1 and the second structure 62 provided for the second rotary shaft 41 of the transmission mechanism 4. In this embodiment, the first structure 61 includes the engaging projection 264 that protrudes along the radius of the first rotary shaft 26, while the second structure 62 includes the engaging recess 412 that is recessed along the radius of the second rotary shaft 41.

Note that when motor 1 is controlled to stop running, the engaging projection 264 does not have to come out of contact with the first side surface of the engaging recess 412. Even if the engaging projection 264 stays in contact with the first side surface of the engaging recess 412, the force F1 with which the engaging projection 264 presses the engaging recess 412 still decreases to say the least. Thus, the inertial force transmitted from the motor 1 to the transmission mechanism 4 is also reduced.

Also, if the transmission mechanism 4, the holder 5, and other members are turning due to the torque applied by the motor 1 running, not only the motor 1 but also the transmission mechanism 4, the holder 5, and other members have inertial energy. Therefore, there are still chances that the fastening member is further fastened due to the inertial energy of those members such as the transmission mechanism 4 and the holder 5 other than the motor 1 when the electronic clutch 32 is activated. Nevertheless, comparing the respective velocities of the motor 1, the transmission mechanism 4, and the holder 5 with each other, it can be seen that the motor 1 has the highest velocity of the three, and therefore, the inertial energy of the motor 1 is sufficiently greater than the inertial energy of the transmission mechanism 4 and the holder 5. Although it depends on the masses, velocities, shapes, and other parameters of the respective members, the inertial energy of the motor 1 may be twice or more as high as the sum of the inertial energy of the transmission mechanism 4 and the inertial energy of the holder 5. Thus, making the inhibiting mechanism 6 inhibit the transmission of the inertial force from the motor 1 to the holder 5 enables controlling the electric tool 100 significantly more accurately according to the torque.

Figure 8:
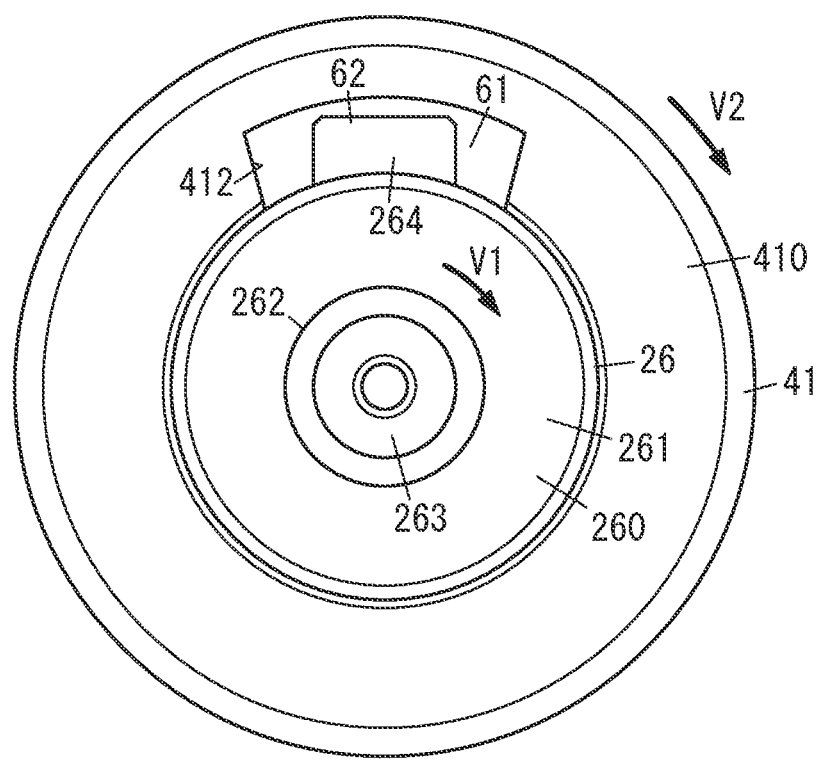
FIG. 8 is a side view of the main part of the electric tool in a different state from the state shown in FIG. 7.

If the state where the velocity V2 of the second rotary shaft 41 is higher than the velocity V1 of the first rotary shaft 26 lasts even after the first side surface of the engaging projection 264 has come out of contact with the first side surface of the engaging recess 412, then the engaging projection 264 further relatively moves counterclockwise in FIG. 8 within the engaging recess 412. Then, a second side surface (i.e., the left side surface in FIG. 9) of the engaging projection 264 of the first rotary shaft 26 comes into contact with a second side surface (i.e., the left side surface in FIG. 9) of the engaging recess 412 of the second rotary shaft 41 (refer to FIG. 9). In this state, the second side surface of the engaging recess 412 of the second rotary shaft 41 presses the second side surface of the engaging projection 264, thus having clockwise rotational force F2 applied from the second rotary shaft 41 to the first rotary shaft 26. That is to say, in this state, the torque is transmitted from the holder 5 to the motor 1 via the transmission mechanism 4.

Figure 9:
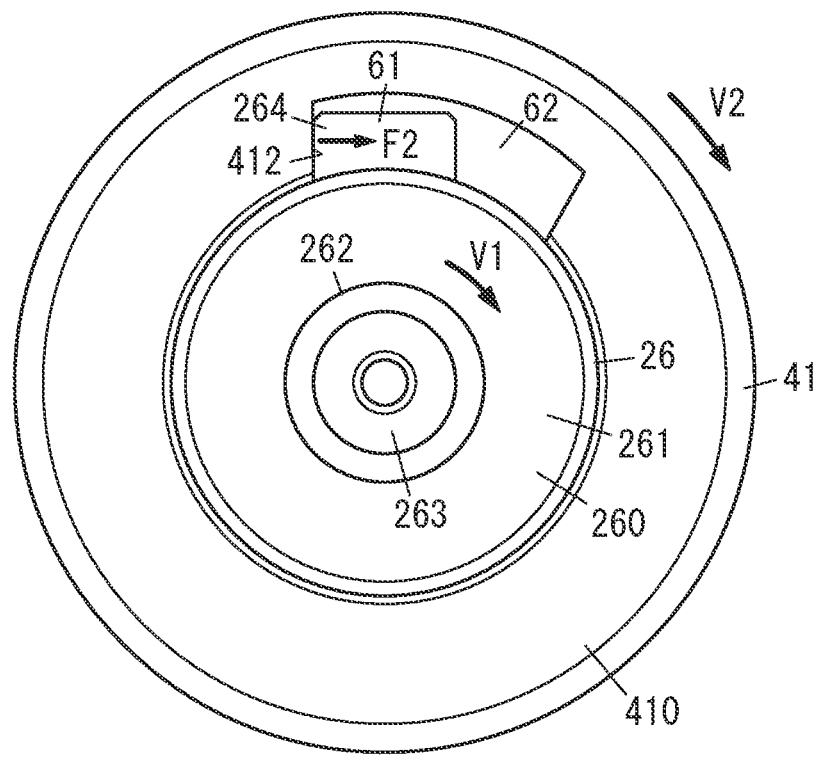
FIG. 9 is a side view of the main part of the electric tool in a different state from the states shown in FIGS. 7 and 8.

In summary, in the electric tool 100 according to this embodiment, there is an idle period in which no torque is transmitted (refer to FIG. 8) as a transitional period between a state where torque is transmitted from the motor 1 to the holder 5 (refer to FIG. 7) and a state where torque is transmitted from the holder 5 to the motor 1 (refer to FIG. 9). It can be said that in the electric tool 100 according to this embodiment, the inhibiting mechanism 6 includes an idle structure that produces such an idle period.

In the electric tool 100 according to this embodiment, the inhibiting mechanism 6 is implemented as a structure as simple as the idle structure.

(3.1) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Note that the exemplary embodiment described above and the variations to be described below may be adopted in combination as appropriate.

(3.1) First Variation

An electric tool 100 according to a first variation will be described with reference to FIG. 10. In the following description, any constituent element of the electric tool 100 according to this first variation, having the same function as a counterpart of the electric tool 100 according to the exemplary embodiment described above, will not be described all over again as appropriate.

Figure 10:
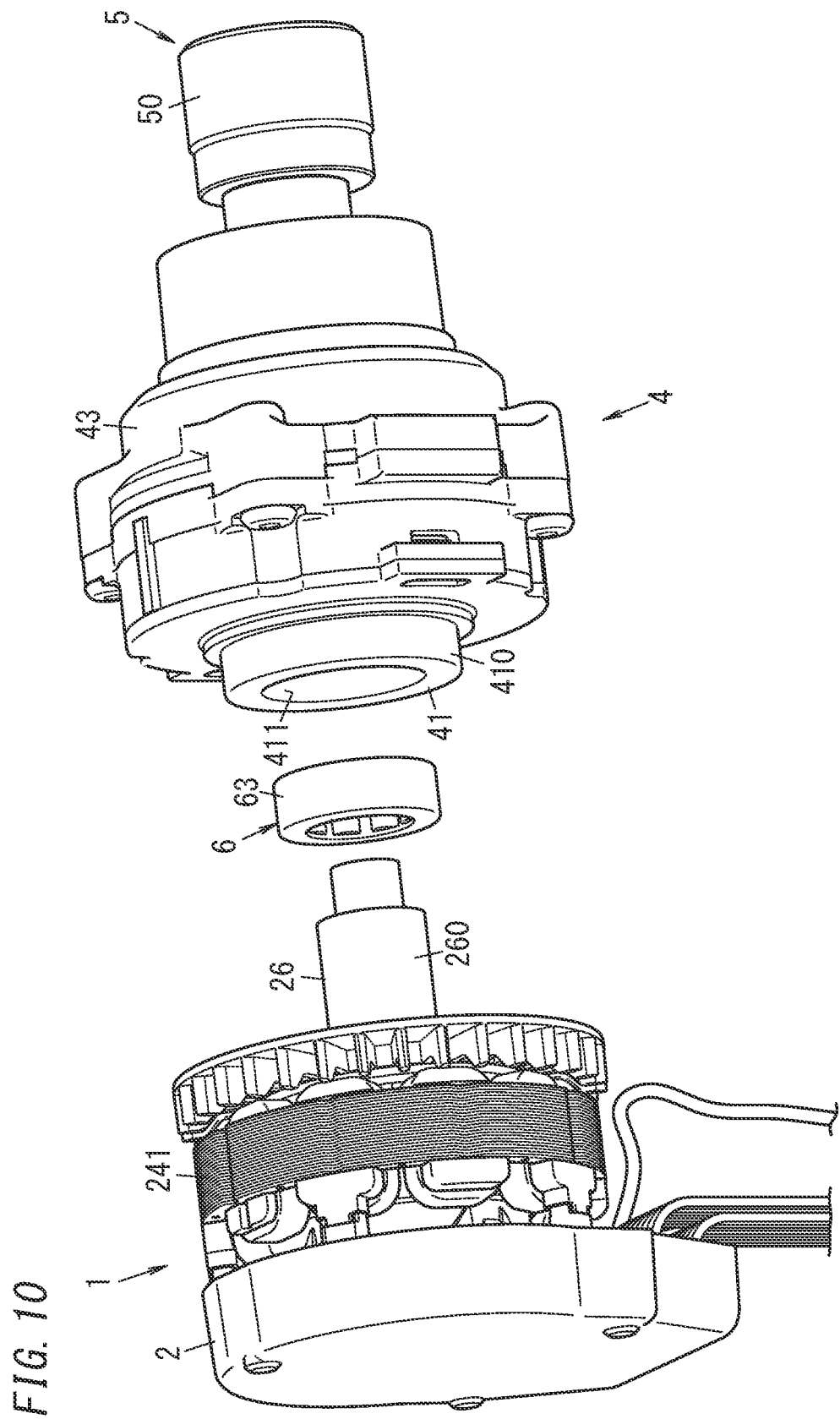
FIG. 10 is an exploded perspective view of a main part of an electric tool according to a first variation.

In the electric tool 100 according to the first variation, the inhibiting mechanism 6 includes a one-way clutch 63 as shown in FIG. 10.

The one-way clutch 63 may be, for example, a clutch mechanism including an inner ring and an outer ring and configured to transmit rotational force in only one direction between the inner ring and the outer ring. In this variation, the one-way clutch 63 transmits the rotational force in only the rotational direction of the first rotary shaft 26 of the motor 1.

The inner ring of the one-way clutch 63 may be fixed to the first rotary shaft 26 of the motor 1, for example, and rotates integrally with the first rotary shaft 26. On the other hand, the outer ring of the one-way clutch 63 may be fixed to the second rotary shaft 41 of the transmission mechanism 4, for example, and rotates integrally with the second rotary shaft 41.

In the electric tool 100 according to the first variation, when the motor 1 is controlled to stop running in response to activation of the electronic clutch 32, the velocity of the second rotary shaft 41 becomes higher than the velocity of the first rotary shaft 26 to cause the second rotary shaft 41 to turn relatively in the opposite direction with respect to the first rotary shaft 26. Thus, the outer ring of the one-way clutch 63 also turns relatively in the opposite direction with respect to the inner ring thereof. This is a direction in which the one-way clutch 63 does not transmit the rotational force. Thus, in this state, transmission of the inertial force from the motor 1 to the holder 5 is reduced by the one-way clutch 63.

The electric tool 100 according to the first variation also enables the inhibiting mechanism 6 (one-way clutch 63) to reduce the chances of fastening a fastening member such as a screw, a bolt, or a nut with excessive torque. This enables controlling the electric tool 100 more accurately according to the torque.

(3.2) Second Variation

An electric tool 100 according to a second variation will be described with reference to FIG. 11. In the following description, any constituent element of the electric tool 100 according to this second variation, having the same function as a counterpart of the electric tool 100 according to the exemplary embodiment described above, will not be described all over again as appropriate.

Figure 11:
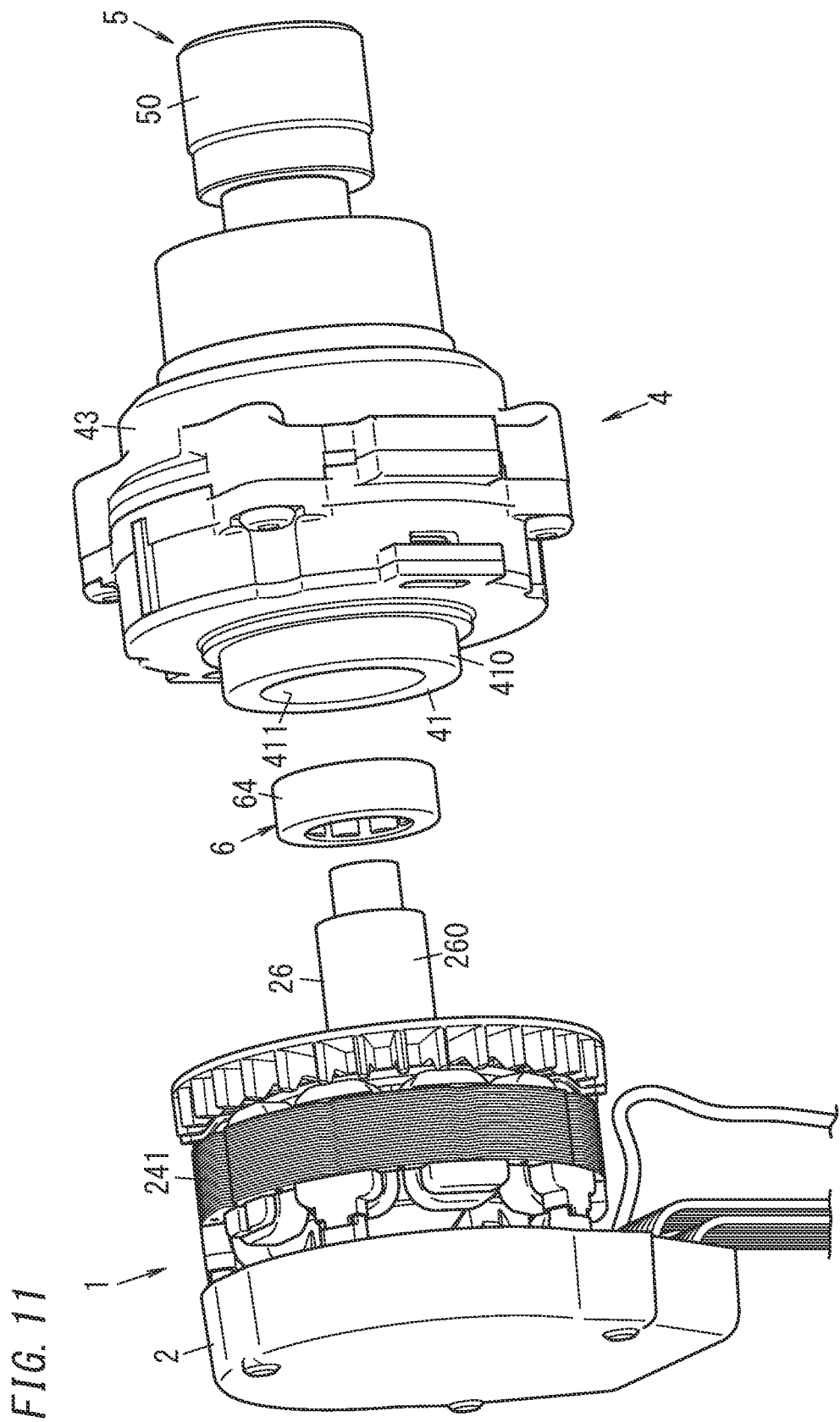
FIG. 11 is an exploded perspective view of a main part of an electric tool according to a second variation.

In the electric tool 100 according to the second variation, the inhibiting mechanism 6 includes a two-way clutch 64 as shown in FIG. 11.

The two-way clutch 64 may be, for example, a clutch mechanism including an inner ring and an outer ring and configured to change, between the inner ring and the outer ring, the direction in which the rotational force is transmitted. Specifically, the two-way clutch 64 may switch from a state where the two-way clutch 64 transmits the rotational force only in the clockwise direction to a state where the two-way clutch 64 transmits the rotational force only in the counterclockwise direction, or vice versa, as viewed from one side along the axis of the inner ring.

The inner ring of the two-way clutch 64 may be fixed to the first rotary shaft 26 of the motor 1, for example, and rotates integrally with the first rotary shaft 26. The outer ring of the two-way clutch 64 may be fixed to the second rotary shaft 41 of the transmission mechanism 4, for example, and rotates integrally with the second rotary shaft 41.

Also, in the electric tool 100 according to the second variation, the motor 1 may also rotate both in the forward direction and the reverse direction. That is to say, the motor 1 may change its rotational direction from the forward direction into the reverse direction, and vice versa. The rotational direction of the motor 1 may be inverted by, for example, inverting the direction of the drive current Ia supplied from the inverter circuit section 2 to the motor 1. The electric tool 100 according to the second variation further includes a forward/reverse switch for changing the rotational direction of the motor 1 from the forward direction into the reverse direction, and vice versa.

In addition, the electric tool 100 according to the second variation further includes a synchronizing mechanism for synchronizing the change of the rotational force transmission direction of the two-way clutch 64 with the change of the rotational direction of the motor 1. The synchronizing mechanism may change the rotational force transmission direction of the two-way clutch 64 in synchronization with the change of the rotational direction of the motor 1 by the forward/reverse switch, for example. The synchronizing mechanism may be a mechanical structure or an electronic circuit (such as a semiconductor switch), whichever is appropriate.

The two-way clutch 64 operates in the same way as the one-way clutch 63, and therefore, description thereof will be omitted herein.

The electric tool 100 according to the second variation also enables the inhibiting mechanism 6 (two-way clutch 64) to reduce the chances of fastening a fastening member such as a screw, a bolt, or a nut with excessive torque. This enables controlling the electric tool 100 more accurately according to the torque.

In addition, the electric tool 100 according to the second variation may also reduce the chances of transmitting the inertial energy of the motor 1 to the holder 5 in both a situation where the motor 1 is rotated in the forward direction and a situation where the motor 1 is rotated in the reverse direction.

(3.3) Other Variations

In one variation, the electric tool 100 may also be a so-called "impact tool" including an impact mechanism for fastening a fastening member by making a hammer collide against an anvil intermittently as the motor 1 rotates.

In another variation, the electric tool 100 according to the exemplary embodiment described above may be modified to allow the motor 1 to rotate both in the forward direction and the reverse direction and to further include a forward/reverse switch for changing the rotational direction of the motor 1 from the forward direction into the reverse direction, and vice versa. In that case, the larger the circumferential dimension X2 of the engaging recess 412 is, the more significantly the inertial energy transmitted from the motor 1 to the transmission mechanism 4 in response to activation of the electronic clutch 32 may be reduced. Nevertheless, if the rotational direction of the motor 1 is changed from the forward direction into the reverse direction, or vice versa, it will take a longer time for the engaging projection 264 to come into contact with the opposite side surface of the engaging recess 412, thus possibly causing a decline in the handiness of the electric tool 100. The circumferential dimension X2 of the engaging recess 412 may be determined appropriately with these factors taken into consideration.

In still another variation, the inhibiting mechanism 6 may be disposed somewhere else, instead of the location between the motor 1 and the speed reducer mechanism 40. For example, the inhibiting mechanism 6 may be provided on the output shaft 42 of the transmission mechanism 4. In a specific example, the output shaft 42 may include a first output shaft (having the same shape as the first circular columnar portion 261 of the first rotary shaft 26) and a second output shaft (having the same shape as the shaft body 410 of the second rotary shaft 41). In that case, the first output shaft and the second output shaft may be arranged coaxially with each other and the inhibiting mechanism 6 may be interposed between the first output shaft and the second output shaft. Alternatively, the inhibiting mechanism 6 may also be provided for the speed reducer mechanism 40 of the transmission mechanism 4 (i.e., for any of the shafts included in the speed reducer mechanism 40).

In yet another variation, a plurality of inhibiting mechanisms 6 may be provided between the motor 1 and the holder 5. For example, three inhibiting mechanisms 6 in total may be provided. Specifically, not only the inhibiting mechanism 6 provided between the motor 1 and the transmission mechanism 4 as in the exemplary embodiment described above but also another inhibiting mechanism 6 provided for the speed reducer mechanism 40 of the transmission mechanism 4 (i.e., any of the shafts included in the speed reducer mechanism 40) and still another inhibiting mechanism 6 provided on the output shaft 42 of the transmission mechanism 4, may be provided.

In yet another variation, the first structure 61 may have an engaging recess and the second structure 62 may have an engaging projection. Specifically, an engaging projection protruding radially may be provided for the second rotary shaft 41 of the transmission mechanism 4, while a receiving recess and an engaging recess depressed radially from the side surface of the receiving recess to receive the engaging projection may be provided for the first rotary shaft 26 of the motor 1. In that case, the diameter of the first rotary shaft 26 may be larger than the diameter of the second rotary shaft 41.

In yet another variation, the torque detector 31 may detect, based on the velocity of the motor 1 as detected by a velocity detector for detecting the velocity (i.e., the number of revolutions) of the motor, a torque value about the output torque provided by the tip tool 28.

In yet another variation, the circumferential dimension X2 of the engaging recess 412 does not have to be about twice as large as the circumferential dimension X1 of the engaging projection 264 but may also be set at an appropriate dimension to inhibit the transmission of the inertial force from the motor 1 to the transmission mechanism 4 in response to the activation of the electronic clutch 32.

(4) ASPECTS

The embodiment and its variations described above are specific implementations of the following aspects of the present disclosure.

An electric tool (100) according to a first aspect includes a motor (1), a holder (5), a transmission mechanism (4), a torque detector (31), an electronic clutch (32), and an inhibiting mechanism (6). The holder (5) is configured to hold a tip tool (28) thereon. The transmission mechanism (4) transmits motive power of the motor (1) to the holder (5). The torque detector (31) detects a torque value about output torque provided by the tip tool (28). The electronic clutch (32) is activated when a predetermined condition about the torque value detected by the torque detector (31) is satisfied and thereby controls the motor (1) to make the motor (1) stop running. The inhibiting mechanism (6) is interposed between the motor (1) and the holder (5). The inhibiting mechanism (6) inhibits transmission of inertial force from the motor (1) to the holder (5) in response to activation of the electronic clutch (32).

This aspect enables controlling the electric tool (100) more accurately according to the torque.

In an electric tool (100) according to a second aspect, which may be implemented in conjunction with the first aspect, the transmission mechanism (4) includes a speed reducer mechanism (40) that reduces a rotational velocity of the motor (1) and transmits rotational force with the rotational velocity thus reduced to the holder (5). The inhibiting mechanism (6) is interposed between the motor (1) and the speed reducer mechanism (40). The inhibiting mechanism (6) inhibits the transmission of the inertial force from the motor (1) to the speed reducer mechanism (40) in response to the activation of the electronic clutch (32).

This aspect enables controlling the electric tool (100) more accurately according to the torque.

In an electric tool (100) according to a third aspect, which may be implemented in conjunction with the first or second aspect, the inhibiting mechanism (6) includes an idle structure that produces an idle period in which no torque is transmitted when a state transition is made from a state where torque is transmitted from the motor (1) to the holder (5) to a state where torque is transmitted from the holder (5) to the motor (1), and vice versa.

This aspect enables controlling the electric tool (100) more accurately according to the torque.

In an electric tool (100) according to a fourth aspect, which may be implemented in conjunction with any one of the first to third aspects, the motor (1) includes a first rotary shaft (26). The transmission mechanism (4) includes a second rotary shaft (41) that turns integrally with the first rotary shaft (26) while keeping in contact with the first rotary shaft (26). The inhibiting mechanism (6) includes: an engaging projection (264) provided for one member selected from the group consisting of the first rotary shaft (26) and the second rotary shaft (41) and protruding radially; and an engaging recess (412) provided for a remaining member selected from the group consisting of the first rotary shaft (26) and the second rotary shaft (41) and recessed radially to receive the engaging projection (264). A circumferential dimension (X2) of the engaging recess (412) is greater than a circumferential dimension (X1) of the engaging projection (264).

This aspect enables controlling the electric tool (100) more accurately according to the torque.

In an electric tool (100) according to a fifth aspect, which may be implemented in conjunction with any one of the first to fourth aspects, the inhibiting mechanism (6) includes a one-way clutch (63).

This aspect enables controlling the electric tool (100) more accurately according to the torque.

In an electric tool (100) according to a sixth aspect, which may be implemented in conjunction with any one of the first to fifth aspects, the inhibiting mechanism (6) includes a two-way clutch (64) enabling changing a torque transmission direction.

This aspect enables controlling the electric tool (100) more accurately according to the torque.

In an electric tool (100) according to a seventh aspect, which may be implemented in conjunction with any one of the first to sixth aspects, the predetermined condition includes a condition that the torque value detected by the torque detector (31) be greater than a threshold value.

This aspect enables reducing the chances of fastening a fastening member with torque greater than a threshold value.

In an electric tool (100) according to an eighth aspect, which may be implemented in conjunction with any one of the first to seventh aspects, the torque detector (31) calculates, based on a torque current flowing through the motor (1), the torque value about the output torque provided by the tip tool (28).

This aspect enables calculating torque based on a torque current.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An electric tool comprising:
a motor;
a holder configured to hold a tip tool thereon;
a transmission mechanism configured to transmit motive power of the motor to the holder;
a torque detector configured to detect a torque value about output torque provided by the tip tool;
an electronic clutch configured to be activated when a predetermined condition about the torque value detected by the torque detector is satisfied and thereby control the motor to make the motor stop running; and
an inhibiting mechanism interposed between the motor and the holder and configured to inhibit transmission of inertial force from the motor to the holder in response to activation of the electronic clutch.

2. The electric tool of claim 1, wherein
the transmission mechanism includes a speed reducer mechanism configured to reduce a rotational velocity of the motor and transmit rotational force with the rotational velocity thus reduced to the holder, and
the inhibiting mechanism is interposed between the motor and the speed reducer mechanism and configured to inhibit the transmission of the inertial force from the motor to the speed reducer mechanism in response to the activation of the electronic clutch.

3. The electric tool of claim 1, wherein
the inhibiting mechanism includes an idle structure configured to produce an idle period in which no torque is transmitted when a state transition is made from a state where torque is transmitted from the motor to the holder to a state where torque is transmitted from the holder to the motor, and vice versa.

4. The electric tool of claim 1, wherein
the motor includes a first rotary shaft,
the transmission mechanism includes a second rotary shaft configured to turn integrally with the first rotary shaft while keeping in contact with the first rotary shaft,
the inhibiting mechanism includes:
an engaging projection provided for one member selected from the group consisting of the first rotary shaft and the second rotary shaft and protruding radially; and
an engaging recess provided for a remaining member selected from the group consisting of the first rotary shaft and the second rotary shaft and recessed radially to receive the engaging projection, and
a circumferential dimension of the engaging recess is greater than a circumferential dimension of the engaging projection.

5. The electric tool of claim 1, wherein
the inhibiting mechanism includes a one-way clutch.

6. The electric tool of claim 1, wherein
the inhibiting mechanism includes a two-way clutch enabling changing a torque transmission direction.

7. The electric tool of claim 1, wherein
the predetermined condition includes a condition that the torque value detected by the torque detector be greater than a threshold value.

8. The electric tool of claim 1, wherein
the torque detector is configured to calculate, based on a torque current flowing through the motor, the torque value about the output torque provided by the tip tool.

* * * * *